Nov. 29, 1955　　　F. C. BADALICH　　　2,724,989
SLIDE CHANGER
Filed March 14, 1952　　　　　　　　　　2 Sheets-Sheet 1
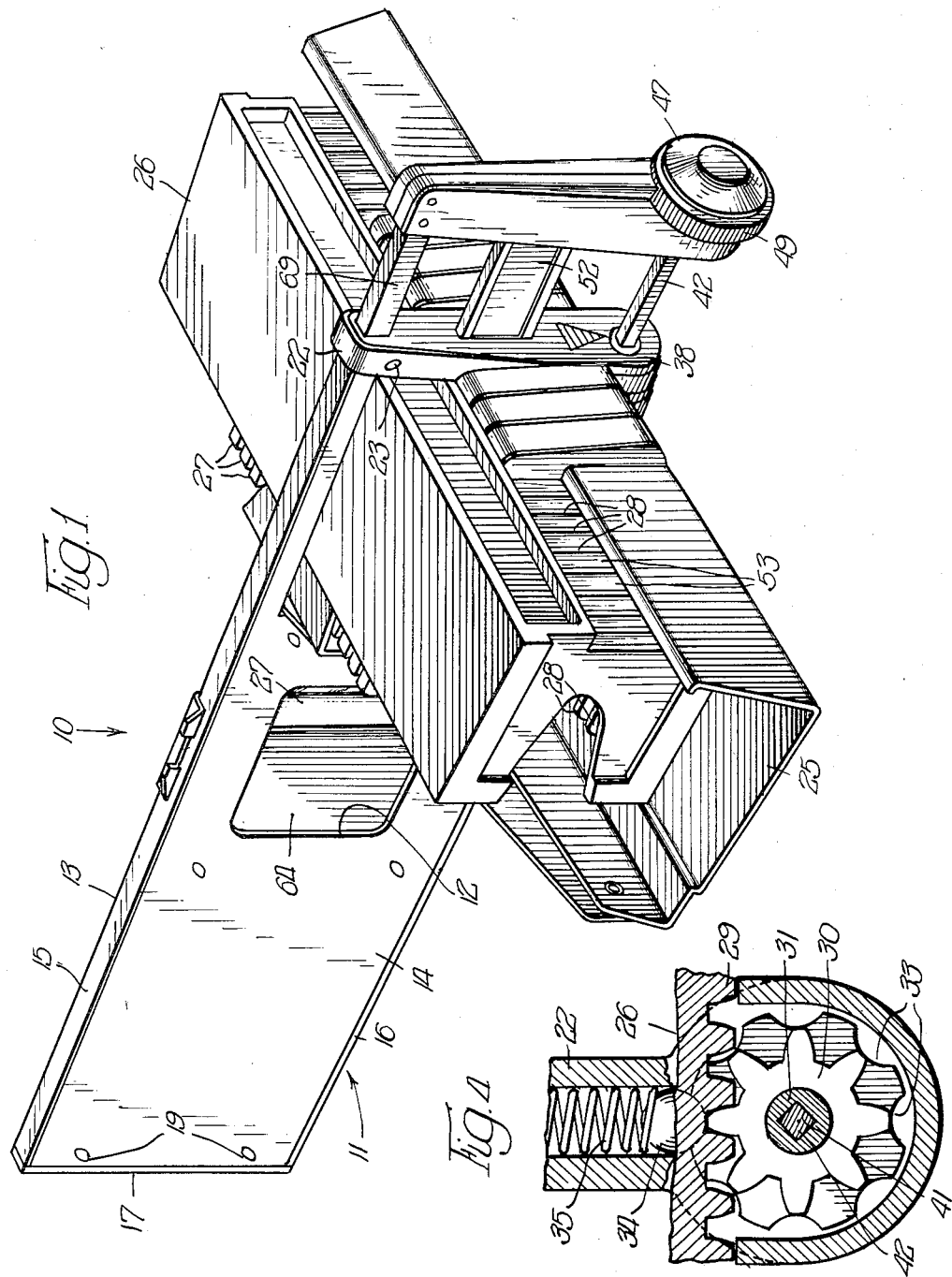
INVENTOR.
Frank C. Badalich,
BY Robert R. Lockwood
atty.

Nov. 29, 1955  F. C. BADALICH  2,724,989
SLIDE CHANGER
Filed March 14, 1952  2 Sheets-Sheet 2
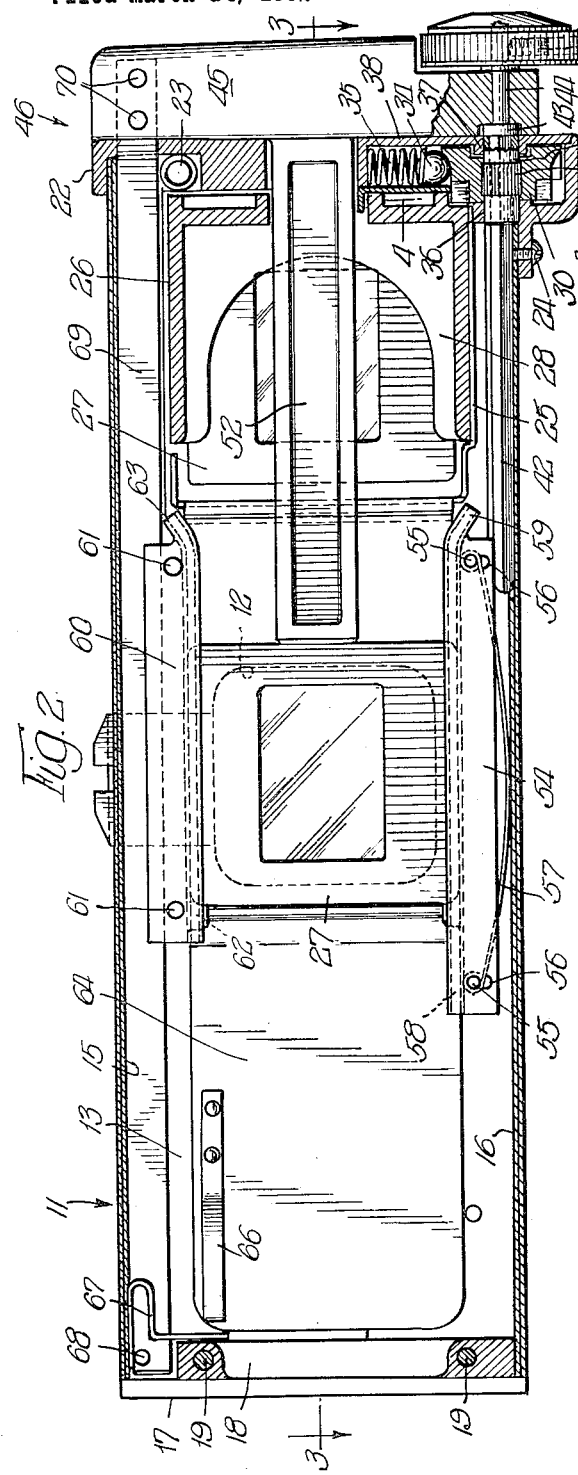
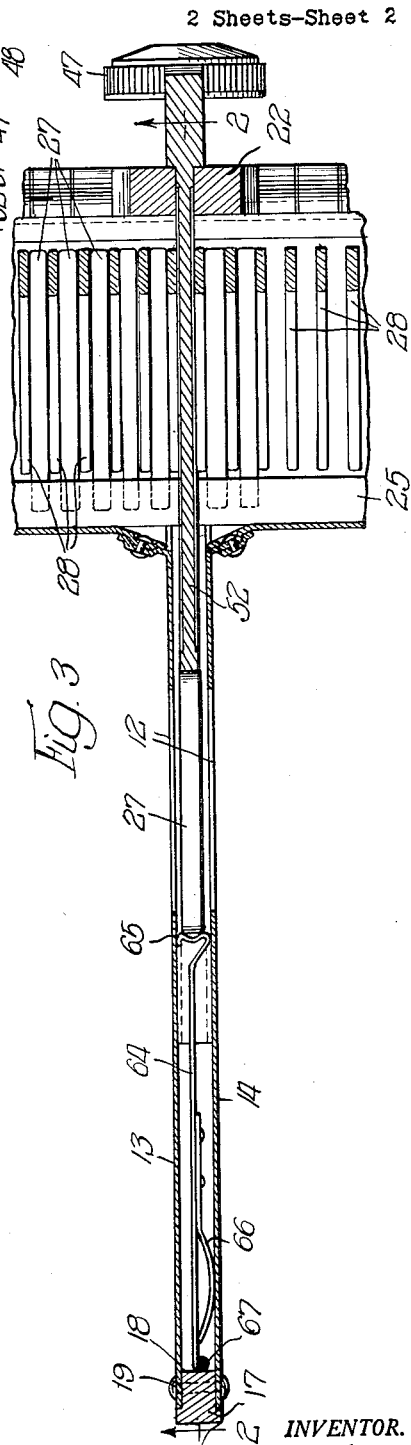
INVENTOR.
Frank C. Badalich,
BY
Robert R. Lockwood
Atty.

United States Patent Office 2,724,989
Patented Nov. 29, 1955

2,724,989

SLIDE CHANGER

Frank C. Badalich, Chicago, Ill., assignor, by mesne assignments, to Bell & Howell Company, Chicago, Ill., a corporation of Illinois Application March 14, 1952, Serial No. 276,633

8 Claims. (Cl. 88—28)

This invention relates to stereopticon slide changers. It constitutes an improvement over the invention disclosed in Bennett and Webb application, Serial No. 110,762, filed August 17, 1949, now Patent No. 2,590,492, dated March 25, 1952, and assigned to the assignee of this application.

Among the objects of this invention are: To provide for sequentially shifting slides into and out of registry with the light beam of a stereopticon projector in an efficient and economical manner; to move the slide carrying tray along the light beam in a step by step fashion in a new and improved manner; to employ a yoke slidable through the tray for moving the slides out of and into the same and to mount operating means on the yoke for shifting the tray along the light beam; and to provide the tray with a lengthwise rack engageable by a pinion and to drive the pinion by means carried by the yoke.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following description taken together with the accompanying drawings, in which:

Figure 1 is a perspective view of a slide changer in which the present invention is incorporated;

Figure 2 is a longitudinal sectional view of the slide changer taken generally along the line 2—2 of Figure 3;

Figure 3 is a longitudinal sectional view of the slide changer taken generally along the line 3—3 of Figure 2; and Figure 4 is a detailed sectional view, at an enlarged scale, taken generally along line 4—4 of Figure 2.

Referring now particularly to Figure 1, it will be observed that the reference character 10 designates, generally, a slide changer for a stereopticon projector constructed in accordance with this invention. The slide changer 10 includes a frame, shown generally at 11, having an aperture 12 intermediate its ends through which the light beam of the projector is projected and in which the slides to be displayed are inserted. The frame 11 is formed by sheet metal front and back plates 13 and 14. The former has its top edge 15 and its bottom edge 16 turned backwardly to overlie the upper and lower edges of the back plate 14. An end plate 17, such as a die casting, is employed between the plates 13 and 14 at one end. It includes a flange 18 which projects into the space between the plates 13 and 14 and it is secured in position by means of rivets 19.

At the other end of the frame 11 there is an end plate 22 which may be a die casting. It is held in position overlying this end of the frame 11 by means of a rivet 23 and a screw 24 on the under side as shown more clearly in Figure 2.

Extending transversely of the frame 11 and along the light beam when it is projected through the aperture 12 is a sheet metal tray holder 25. The tray holder 25 is arranged to slidably receive a tray 26 that may be formed of molded plastic, such as phenolic condensation product. The tray 26 is arranged to hold a series of slides 27 which are of conventional construction, the slides being held in parallel spaced relation by dividers or septums 28, which are molded integrally with the tray 26. It will be understood that the slides 27 are arranged to be moved out of the tray holder 25 and across the aperture 12 through the light beam and then returned to the tray holder 25. The manner in which this is accomplished will be described presently.

As shown more clearly in Figure 4, the underside of the tray 26 is provided with a lengthwise extending rack 29. A pinion 30 rotatably mounted on the frame 11 has its teeth meshing with the teeth of the rack 29 so that on rotation of the pinion 30, the tray 26 is moved along the tray holder 25 in either a forward or reverse direction, depending upon the direction of rotation of the pinion 30 which preferably is formed of metal. The pinion 30 is fast on a bushing 31 which has a knurled central section 32 so as to insure that the pinion 30 is rotatable with the bushing 31.

It is desirable that the tray 26 be located in predetermined positions with respect to the tray holder 25 so that the slides 27 can be removed therefrom and returned thereto in positions in alignment with the space between the front and back plates 13 and 14 of the frame 11. For this purpose, the pinion 30 is provided with peripheral recesses 33 with which a spring pressed detent cooperates. This detent comprises a ball 34 and a coil compression spring 35 which are located in a suitable socket in the end plate 22 as shown more clearly in Figure 4. The spring pressed ball 34 is arranged to interfit with the recesses 33, and the arrangement is such that when this takes place a slide in the tray 26 is in position to be moved into the space between the front and back plates 13 and 14 of the frame 11.

The bushing 31 is journaled in a bearing 36 which may be formed integrally with the end plate 22, as shown in Figure 2. The other end of the bushing 31 is journaled in a bearing 37 that is formed in a cover plate 38. If desired, the cover plate 38 may be formed integrally with the end plate 22.

It will be observed that the bushing 31 has a centrally located square opening 41, the purpose of which is to slidably receive a shaft 42 which has a square cross section. As shown in Figure 2, the shaft 42 has a collar 43 brazed to the shoulder near its outer end beyond which there is a circular bearing section 44. This bearing section 44 is journaled in a cross head 45 that forms a part of a yoke indicated, generally, at 46. A knob 47 is secured by a set screw 48 to the outer end of the circular bearing section 44 of the shaft 42. It has a knurled periphery 49 to facilitate its being gripped by the operator's thumb and forefinger for rotating the shaft 42.

The yoke 46 includes a lower arm 52 which is arranged to extend through spaces 53 between the dividers or septums 28 of the tray 26 for the purpose of engaging one side of the slide 27 in alignment therewith for movement out of the tray 26 and into the aperture 12.

The lower edge of the slide 27, as shown in Figure 2, rides upon a lower trough-like guide member 54 which has some relative movement with respect to the frame 11. This relative movement is provided by transversely extending pins 55 which project through slots 56 in the front and back plates 13 and 14. A leaf spring 57 has its ends turned around the pins 55 and its central portion bearing against the upper surface of the bottom edge 16. This spring 57 biases the guide member 54 upwardly while the slots 56 are of sufficient length to accommodate some variation in the heights of the slides 27. The guide member 54 has a U-shaped upper surface 58 for receiving the lower edge of the slide 27. Also it has a down turned end 59 for guiding the lower edge of the slide 27 onto the upper surface 58.

The upper edge of the slide 27 is received by an upper trough-like guide member 60 which is held in position in the frame 11 by means of transversely extending rivets 61. The guide member 60 has an inverted U-shaped under surface 62 and an upwardly turned end 63 to facilitate entry of the slide 27.

In order to close the aperture 12 in the absence of a slide 27 so as to prevent the light beam from shining directly upon the screen, and also for the purpose of returning the slide 27 to the tray 26, a shutter 64 is provided. The shutter 64 may be formed of sheet metal and it has a grooved end 65 into which the adjacent end of the slide 27 interfits so that there will be no gap therebetween. The grooved end 65 is deep enough so that the sides thereof overlap the slide 27. A friction spring 66 is secured to the shutter 64 and bears against the back plate 14, as shown in Figure 3, for holding the shutter 64 in position. At the upper left hand corner of the shutter 64, as viewed in Figure 2, a goose neck spring 67 is secured and it is arranged to cooperate with a pin 68 which extends transversely through an upper arm 69 of the yoke 46. Rivets 70 secure the arm 69 in fixed position on the cross head 45.

In describing the operation of the slide changer 10, it will be assumed that a number of slides 27 are carried by the tray 26 and that they are to be moved one by one into and out of the aperture 12 in the frame 11. For this purpose, the yoke 46 is moved inwardly to the position shown in Figure 2. When this takes place, the lower arm 52 moves through the space 53 in registry therewith and its inner end engages the adjacent side of the corresponding slide 27. Continued inward movement of the yoke 46 moves the slide 27 to a position between the guide members 54 and 60, moving the guide member 54 downwardly slightly, depending upon the height of the slide 27. The opposite edge of the slide 27 engages the grooved end 65 of the shutter 64 and moves it out of registry with the aperture 12 to the position shown in Figure 2.

When it is desired to change the slide 27, the yoke 46 is moved outwardly thereby withdrawing the lower arm 52 from its position extending through the tray 26 where it prevents any movement thereof along the tray holder 25. When the yoke 46 is moved as described, the pin 68 engages the goose neck spring 67 and causes the shutter 64 to move back to the position where it covers the aperture 12. In so doing the shutter 64 moves the slide 27 back from between the guide members 54 and 60 into its position in the tray 26. When this is accomplished, the shutter 64 completely masks the aperture 12 and the lower arm 52 has been moved completely out of the tray 26.

Now it is desirable to advance or retract the tray 26, depending upon which slide it is desired to display next. Since the shaft 42 is carried by the cross head 45 and slides through the bushing 31, the knob 47 can be rotated when the yoke is in this extended position to rotate the square shaft 42 and thereby rotate the pinion 30. It will be understood that the square shaft 42 slides through the square opening 41 in the bushing 31 when the yoke 46 is withdrawn to return the slide 27 to the tray 26. The rotation of the knob 47 raises the ball 34 out of the recess 33 in which it is located. The knob 47 can be rotated one or more spaces as determined by the engagement of the ball 34 with the recesses 33, depending upon the particular slide that it is desired to show next.

After the tray 26 has been advanced or retracted along the tray holder 25, the yoke 46 is moved inwardly to eject the next slide from the tray 26 in the manner described.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed is:

1. A device for changing slides supported in parallel relation in a tray along one side of a light beam of a stereopticon projector comprising, in combination, a frame for extending transversely of said light beam having an aperture therein through which said light beam can be projected, a tray holder extending transversely of said frame for slidably supporting said tray, an operating member slidable endwise of said frame through said tray to move the slides therein one by one out of and back into said tray and into and back out of said light beam, motion translating means on said frame for moving said tray along said tray holder, operating means movably bodily carried by said operating member, and means operatively interconnecting said operating means with said motion translating means for operating the same to move said tray along said tray holder only when said operating member is withdrawn from said tray, said motion translating means being operated on movement of said operating means with respect to said operating member.

2. A device for changing slides supported in parallel relation in a tray along one side of a light beam of a stereopticon projector comprising, in combination, a frame for extending transversely of said light beam having an aperture therein through which said light beam can be projected, a tray holder extending transversely of said frame for slidably supporting said tray, an operating member slidable endwise of said frame through said tray to move the slides therein one by one out of and back into said tray and into and back out of said light beam, motion translating means on said frame for moving said tray along said tray holder, an operator, means mounting said operator on said operating member for conjoint movement therewith and for rotation in either direction in a plane at right angles to the plane of endwise movement of said operating member, and driving means interconnecting said motion translating means and said operator for moving said tray in either direction along said tray holder by rotation of said operator only when said operating member is withdrawn from said tray.

3. A device for changing slides supported in parallel relation in a tray along one side of a light beam of a stereopticon projector, said tray having a lengthwise extending rack, comprising, in combination, a frame for extending transversely of said light beam having an aperture therein through which said light beam can be projected, a tray holder extending transversely of said frame for slidably supporting said tray, an operating member slidable endwise of said frame through said tray to move the slides therein one by one out of and back into said tray and into and back out of said light beam, a pinion rotatably mounted on said frame for engaging said rack to move said tray along said tray holder, an operator, means mounting said operator on said operating member for conjoint movement therewith and for rotation in either direction in a plane at right angles to the plane of endwise movement of said operating member, and torque transmitting means slidably and non-rotatably connected to said pinion and connected to and rotatable with said operator for moving said tray in either direction along said tray holder by rotation of said operator only when said operating member is withdrawn from said tray.

4. A device for changing slides supported in parallel relation in a tray along one side of a light beam of a stereopticon projector, said tray having a lengthwise extending rack, comprising, in combination, a frame for extending transversely of said light beam having an aperture therein through which said light beam can be projected, a tray holder extending transversely of said frame for slidably supporting said tray, an operating member slidable endwise of said frame through said tray to move the slides therein one by one out of and back into said tray and into and back out of said light beam, a pinion rotatably mounted on said frame for engaging said rack to move said tray along said tray holder, an operator rotatably mounted on said operating member, and a shaft non-rotatably and slidably interconnecting said pinion and said operator whereby rotation of the latter with said operating member withdrawn from said tray shifts the same along said tray holder.

5. A slide changer for a stereopticon projector comprising, in combination, a frame for extending transversely of the light beam of the projector and having an aperture therefor, a tray holder extending transversely of said frame, a slide holding tray slidably mounted on said tray holder and having a lengthwise rack, a pinion rotatably mounted on said frame and engaging said rack, a yoke slidable endwise of said frame through said tray to move the slides therein one by one out of and back into said tray and into and back out of said aperture, a knob rotatably mounted on and movable with said yoke, and a shaft non-rotatably and slidably interconnecting said knob and said pinion for rotating the same when said yoke is withdrawn from said tray.

6. A slide changer for a stereopticon projector comprising, in combination, a frame for extending transversely of the light beam of the projector and having an aperture therefor, a tray holder extending transversely of said frame, a slide holding tray slidably mounted on said tray holder and having a lengthwise rack, a pinion rotatably mounted on said frame and engaging said rack, a shutter slidable on said frame for closing said aperture in the absence of a slide, a yoke slidable endwise of said frame and having one arm movable through said tray to engage one edge of a slide therein and move the same therefrom into registry with said aperture while the opposite edge of the slide engages said shutter to move the same out of registry with said aperture, said yoke having another arm for connection to said shutter to move the same back into registry with said aperture and said slide back into said tray, a knob rotatably mounted on and movable with said yoke, and a shaft non-rotatably and slidably interconnecting said pinion for rotating the same when said one arm is withdrawn from said tray to move the same for placing another slide in registry with said one arm.

7. A slide changer for a stereopticon projector comprising, in combination, a frame for extending transversely of the light beam of the projector and having an aperture therefor, a tray holder extending transversely of said frame, a slide holding tray slidably mounted on said tray holder and having a lengthwise rack, a pinion rotatably mounted on said frame and engaging said rack and having a non-circular aperture, a spring pressed detent cooperating with said pinion to hold the same and thereby said tray in any position on said tray holder to which they may be operated, a shutter slidable on said frame for closing said aperture in the absence of a slide, a yoke slidable endwise of said frame and having one arm movable through said tray to engage one edge of a slide therein and move the same therefrom into registry with said aperture while the opposite edge of the slide engages said shutter to move the same out of registry with said aperture, said yoke having another arm for connection to said shutter to move the same back into registry with said aperture and said slide back into said tray, a knob rotatably mounted on said yoke and movable therewith, and a non-circular shaft fastened to said knob and slidable through said non-circular aperture in said pinion for rotating the same when said one arm is withdrawn from said tray to move the same for placing another slide in registry with said one arm.

8. A slide changer for a stereopticon projector comprising, in combination, a frame for extending transversely of the light beam of the projector and having an aperture therefor, a tray holder extending transversely of said frame, a slide holding tray slidably mounted on said tray holder and having a lengthwise rack on its underside, a pinion rotatably mounted on said frame and engaging said rack and having a square opening therethrough along its axis of rotation, a spring pressed detent cooperating with said pinion to hold the same and thereby said tray in any position on said tray holder to which they may be operated, a shutter slidable on said frame for closing said aperture in the absence of a slide, a yoke slidable endwise of said frame and having one arm movable through said tray to engage one edge of a slide therein and move the same therefrom into registry with said aperture while the opposite edge of the slide engages said shutter to move the same out of registry with said aperture, said yoke having another arm above said tray holder for connection to said shutter to move the same back into registry with said aperture and said slide back into said tray, a knob mounted on the underside of said yoke and movable therewith and rotatable about the axis of rotation of said pinion, and a shaft having a square cross section fastened to said knob and movable along the bottom of said frame underneath said tray holder and slidable through said square opening in said pinion for rotating the same when said one arm is withdrawn from said tray to move the same for displaying another slide.

References Cited in the file of this patent
UNITED STATES PATENTS

| | | |
|---|---|---|
| 594,819 | Allen | Nov. 30, 1897 |
| 998,305 | Roebuck | July 18, 1911 |
| 1,402,791 | Petherick | Jan. 10, 1922 |
| 2,297,532 | Brost et al. | Sept. 29, 1942 |
| 2,401,506 | Pechkranz | June 4, 1946 |
| 2,427,164 | Stechbart | Sept. 9, 1947 |
| 2,460,359 | Page | Feb. 1, 1949 |
| 2,583,442 | Parlini et al. | Jan. 22, 1952 |
| 2,590,492 | Bennett et al. | Mar. 25, 1952 |

FOREIGN PATENTS

| | | |
|---|---|---|
| 427,684 | France | Mar. 15, 1911 |